(12) United States Patent
Kirchner et al.

(10) Patent No.: US 7,395,708 B2
(45) Date of Patent: Jul. 8, 2008

(54) FLOW MEASURING APPARATUS INCLUDING A PISTON MOVABLE IN THE FLOW BARREL

(75) Inventors: Mark W. Kirchner, Seattle, WA (US); John D. Tomlinson, Seattle, WA (US)

(73) Assignee: SkoFlo Industries, Inc., Woodinville, WA (US)

( * ) Notice: Subject to any disclaimer, the term of this patent is extended or adjusted under 35 U.S.C. 154(b) by 0 days.

(21) Appl. No.: 11/742,239

(22) Filed: Apr. 30, 2007

(65) Prior Publication Data

US 2008/0006095 A1   Jan. 10, 2008

Related U.S. Application Data

(60) Provisional application No. 60/795,704, filed on Apr. 28, 2006.

(51) Int. Cl.
G01F 3/14 (2006.01)
(52) U.S. Cl. ...................................................... 73/239
(58) Field of Classification Search .................... 73/239
See application file for complete search history.

(56) References Cited

U.S. PATENT DOCUMENTS

| 1,586,834 A | 6/1926 | Ormsby |
| 1,777,261 A | 9/1930 | Grainger et al. |
| 3,677,288 A | 7/1972 | Martin |
| 4,055,084 A | 10/1977 | Wilde et al. |
| 4,096,747 A | 6/1978 | Gilson |
| 4,131,128 A | 12/1978 | Gotzenberger et al. |
| 4,176,686 A | 12/1979 | Stahle et al. |
| 4,210,171 A | 7/1980 | Rikuta et al. |
| 4,234,013 A | 11/1980 | Rikuta et al. |
| 4,250,915 A | 2/1981 | Rikuta et al. |
| 4,361,147 A | 11/1982 | Aslanian et al. |
| 4,372,147 A | 2/1983 | Waugh et al. |
| 4,388,835 A * | 6/1983 | Rosaen ..................... 73/861.58 |
| 4,422,470 A | 12/1983 | Jackson et al. |
| 4,429,708 A | 2/1984 | Strueh |
| 4,449,548 A | 5/1984 | Tutherly |
| 4,481,805 A * | 11/1984 | Dobesh ....................... 73/1.17 |
| 4,508,140 A | 4/1985 | Harrison |
| 4,513,777 A | 4/1985 | Wright |
| 4,549,426 A | 10/1985 | Erickson |

(Continued)

*Primary Examiner*—Harshad Patel
(74) *Attorney, Agent, or Firm*—Perkins Coie LLP (57) ABSTRACT

A flow measuring apparatus of an embodiment is provided that comprises a cylinder and a piston movable in the cylinder between first and second positions. The piston divides the cylinder's interior area into first and second portions. A biasing member urges the piston toward the first position. A first fluid passageway allows fluid to bypass the piston, and a second fluid passageway is in fluid communication with the first fluid passageway and with the first portion of the cylinder. The second fluid passageway provides fluid to the first portion of the cylinder to move the piston toward the second position. A flow diverter is movable between a first flow position that allows fluid to pass through the first fluid passageway to the outlet and a second flow position that causes fluid to flow into the second flow passageway and into the first portion of the chamber. A retention mechanism is moveable to move the flow diverter to the closed position and is moveable to allow the flow diverter to move to the open position when the piston reaches the second position.

33 Claims, 11 Drawing Sheets

U.S. PATENT DOCUMENTS

| | | |
|---|---|---|
| 4,549,572 A | 10/1985 | Wright |
| RE32,157 E * | 5/1986 | Waugh et al. ............... 73/1.17 |
| 4,634,095 A | 1/1987 | Taylor |
| 4,673,162 A | 6/1987 | Lachmann et al. |
| 4,679,592 A | 7/1987 | Lamb |
| 4,813,447 A | 3/1989 | Ichiryu et al. |
| 4,829,808 A | 5/1989 | West |
| 4,893,649 A | 1/1990 | Skoglund |
| 4,921,547 A | 5/1990 | Kosarzecki |
| 5,004,006 A | 4/1991 | Jung et al. |
| 5,052,211 A * | 10/1991 | Cohrs et al. ............... 73/1.23 |
| 5,143,116 A | 9/1992 | Skoglund |
| 5,190,075 A | 3/1993 | Tentler et al. |
| 5,234,025 A | 8/1993 | Skoglund |
| 5,247,139 A | 9/1993 | Schon et al. |
| 5,249,773 A | 10/1993 | Feld |
| 5,255,711 A | 10/1993 | Reeds |
| 5,280,805 A | 1/1994 | Skoglund |
| 5,295,506 A | 3/1994 | Smith |
| 5,299,775 A | 4/1994 | Kolze |
| 5,301,713 A | 4/1994 | Skoglund |
| 5,383,489 A | 1/1995 | Golestan et al. |
| 5,408,886 A | 4/1995 | Lalin |
| 5,427,139 A | 6/1995 | Hilton |
| 5,427,149 A | 6/1995 | Higgs |
| 5,456,107 A * | 10/1995 | Padden et al. ............... 73/239 |
| 5,490,539 A | 2/1996 | Ottestad et al. |
| 5,562,002 A | 10/1996 | Lalin |
| 5,597,012 A | 1/1997 | Moinard et al. |
| 5,615,708 A | 4/1997 | Barron |
| 5,622,204 A | 4/1997 | Skoglund |
| 5,634,491 A | 6/1997 | Benedict |
| 5,655,568 A | 8/1997 | Bhargava et al. |
| 5,718,410 A | 2/1998 | Baumann |
| 5,775,369 A | 7/1998 | Hagmann et al. |
| 5,878,766 A | 3/1999 | Dekhtyar |
| 5,931,186 A | 8/1999 | Skoglund |
| 5,964,408 A | 10/1999 | Musson |
| 5,971,012 A | 10/1999 | Skoglund |
| 5,975,654 A | 11/1999 | Zaviska et al. |
| 5,996,615 A | 12/1999 | Zuegner et al. |
| 6,026,850 A | 2/2000 | Newton et al. |
| 6,041,807 A | 3/2000 | Honaga et al. |
| 6,062,257 A | 5/2000 | Wild et al. |
| 6,098,598 A | 8/2000 | Riefenstahl et al. |
| 6,167,906 B1 | 1/2001 | Liberfarb |
| 6,189,564 B1 | 2/2001 | Hilton |
| 6,209,578 B1 | 4/2001 | Newton |
| 6,298,879 B1 | 10/2001 | Knapp et al. |
| 6,314,980 B1 | 11/2001 | Beswick et al. |
| 6,443,174 B2 | 9/2002 | Mudd |
| 6,568,656 B1 | 5/2003 | Wrocklage |
| 6,616,837 B2 | 9/2003 | Tovar De Pablos et al. |
| 6,640,830 B2 | 11/2003 | Zahe et al. |
| 6,644,345 B2 | 11/2003 | Dulin |
| 6,688,319 B2 | 2/2004 | Trantham et al. |
| 6,729,346 B2 | 5/2004 | Fuhrmann et al. |
| 6,751,939 B2 | 6/2004 | Futa, Jr. et al. |
| 2001/0032675 A1 | 10/2001 | Russell |
| 2002/0008219 A1 | 1/2002 | Yokoyama et al. |
| 2002/0100506 A1 | 8/2002 | May |
| 2002/0134441 A1 | 9/2002 | Kusumoto et al. |
| 2003/0012845 A1 | 1/2003 | Doyle et al. |
| 2003/0041902 A1 | 3/2003 | Dulin |
| 2003/0051754 A1 | 3/2003 | Kirkman et al. |
| 2003/0084940 A1 | 5/2003 | Lee |
| 2003/0192597 A1 | 10/2003 | Trantham et al. |
| 2004/0011406 A1 | 1/2004 | Weber |
| 2004/0154672 A1 | 8/2004 | Liberfarb |
| 2004/0202552 A1 | 10/2004 | Okii et al. |
| 2005/0002831 A1 | 1/2005 | Ashe et al. |
| 2005/0016597 A1 | 1/2005 | Hope et al. |
| 2005/0077099 A1 | 4/2005 | Hayashi et al. |
| 2005/0092368 A1 | 5/2005 | Tahir et al. |
| 2005/0189508 A1 | 9/2005 | Beswick et al. |
| 2005/0199289 A1 | 9/2005 | McDonald et al. |
| 2005/0211305 A1 | 9/2005 | Kirchner et al. |
| 2005/0211942 A1 | 9/2005 | Koester et al. |
| 2005/0230494 A1 | 10/2005 | Lucas et al. |
| 2005/0263280 A1 | 12/2005 | Sellers et al. |
| 2006/0060252 A1 | 3/2006 | Taylor |

* cited by examiner

FLOW MEASURING APPARATUS INCLUDING A PISTON MOVABLE IN THE FLOW BARREL

CROSS-REFERENCE TO RELATED APPLICATION

This non-provisional patent application claims priority to U.S. Provisional Patent Application No. 60/795,704, filed Apr. 28, 2006, and which is hereby incorporated herein by reference thereto.

TECHNICAL FIELD

This invention relates generally to flow measuring apparatus for use with a fluid flow with a flow rate, including apparatus useable as meter provers and/or positive displacement flow meters.

BACKGROUND

Meter provers are positive displacement devices that launch pistons in barrels, timing their travel time to deduce the flow rate. Piston travel is typically monitored in only one direction to calibrate or check accuracy of a flow meter. Provers tend to have elaborate hardware to minimize the flow rate measurement errors and are typically intended to calibrate meters used in flow lines greater than four inches in diameter. For smaller lines, the piston meter prover concept has been used to make positive displacement flow meters by providing mechanisms that allow the piston to reciprocate continuously. Reciprocation is facilitated by mechanical linkages that divert valve mechanisms or by electrically operated three or four way diverting valves to achieve piston reciprocation. Often in high pressure hydraulic systems it is desirable to measure flow rates below five gallons per day. For various reasons, a continuous flow measurement may not be required, but a reliable, accurate means tolerant to debris is desirable.

SUMMARY

The present invention is direct flow measuring apparatus, such as flow meter assemblies and meter provers, that overcomes drawbacks in the prior art and provides additional benefits. In one embodiment a flow measuring apparatus comprises a barrel having an interior area and a piston movable in the barrel between first and second positions. The piston divides the interior area into first and second portions. A biasing member is coupled to the piston and urges the piston toward the first position. A first fluid passageway has an inlet, an outlet and an intermediate portion therebetween. A second fluid passageway is in fluid communication with the first fluid passageway and with the first portion of the barrel. The second fluid passageway provides fluid from the intermediate portion of the first fluid passageway to the first portion of the barrel to move the piston toward the second position. A valve assembly is coupled to the first fluid passageway downstream of the intermediate portion. The valve assembly is movable between open and closed positions. In the open position the valve assembly allows fluid to pass through the first fluid passageway to the outlet. In the closed position the valve assembly causes fluid to flow into the second flow passageway and into the first portion of the chamber to move the piston from the first position to the second position. The valve assembly configured to move toward the open position to release pressure from the barrel in an overpressure condition.

A latch mechanism is coupled to the valve assembly and is movable between an activated position and a released position. The latching mechanism in the activated position moves the valve assembly to the closed position, and the latching mechanism in the released position allows the valve assembly to move to the open position. The latching mechanism is configured to move to the released position at least when the piston reaches the second position. An actuator is coupled to the latching mechanism and configured to activate the latch mechanism to move the valve assembly to the closed position to cause the fluid to move the piston to the second position. A measuring device monitors the movement of the piston between the first and second positions through a stroke and the time to complete the stroke.

Another aspect of the invention provides a flow measuring apparatus comprising: a first fluid passageway having a fluid inlet configured to receive a fluid flow, a fluid outlet, and an intermediate portion therebetween. A biased piston is movable between first and second positions. The piston is biased toward the first position. A second fluid passageway provides fluid from the intermediate portion of the first fluid passageway to a portion of the piston to move the piston toward the second position. A valve is coupled to the first fluid passageway downstream of the intermediate portion. The valve has a valve member movable between open and closed positions. In the open position the valve member allows the fluid flow to pass through the first fluid passageway to the fluid outlet. In the closed position the valve member directs the fluid flow into the second flow passageway and to the portion of the piston to move the piston from the first position to the second position. The valve has a biasing member that urges the valve member with an urging force toward the closed position. The biasing member allows the valve member to move away from the closed position when fluid pressure on the valve member exerts a force that exceeds the urging force.

An activation mechanism is coupled to the valve and is movable between a released position wherein the valve is in the open position and an activated position that causes the valve to move to the closed position. The activation mechanism moves to the released position at least when the piston reaches the second position. A measuring device is configured to monitor the movement of the piston between the first and second positions through a stroke and the time to complete the stroke.

Another aspect provides a flow measuring apparatus comprising: a cylinder having an interior area, and a piston movable in the interior area between first and second positions. The piston divides the interior area into first and second portions. A biasing member urges the piston toward the first position. A first fluid passageway allows fluid to bypass the piston, and a second fluid passageway is in fluid communication with an intermediate portion of the first fluid passageway and with the first portion of the cylinder. The second fluid passageway is configured to provide fluid from the first fluid passageway to the first portion of the cylinder to move the piston toward the second position.

A flow diverter is coupled to the first fluid passageway downstream of the intermediate portion. The flow diverter is movable between a first flow position that allows fluid to pass through the first fluid passageway to the outlet and a second flow position that causes fluid to flow into the second flow passageway and into the first portion of the chamber to move the piston toward the second position. A retention mechanism is coupled to the flow diverter and is moveable to move the flow diverter to the closed position. The retention mechanism is moveable to allow the flow diverter to move to the open position when the piston reaches the second position. A sensor configured to monitor the movement of the piston between the first and second positions through a stroke and the time to complete the stroke.

DETAILED DESCRIPTION

The present invention is directed toward flow measuring apparatus, including meter provers and positive displacement flow meters. Several aspects of embodiments are directed toward flow measuring apparatus that include a piston moving in a barrel while compressing a return spring whilst the piston moves through its measurement stroke. Other aspects of the invention are directed to a piston launched in a measurement direction by blocking a by-pass that, in the open mode, routes flow around the piston. This blockage can be achieved with a spring loaded sealing pad. In several applications, the sealing pad pressure is generally greater than the piston pressure to overcome the return spring. The action of the sealing pad opening and closing can be of mechanical means such as linkages or by an actuator such as a solenoid. The piston movement can be measured with the use of proximity sensors, with inductive means, or via other devices.

In the following description, numerous specific details are provided, such as particular meter configurations, to provide a thorough understanding of and an enabling description for embodiments of the invention. Those of ordinary skill in the art, however, will recognize that the invention can be practiced without one or more of the specific details explained in the following description. In other instances, well-known structures or operation are not shown or described in detail to avoid obscuring aspects of the invention.

Figure 1:
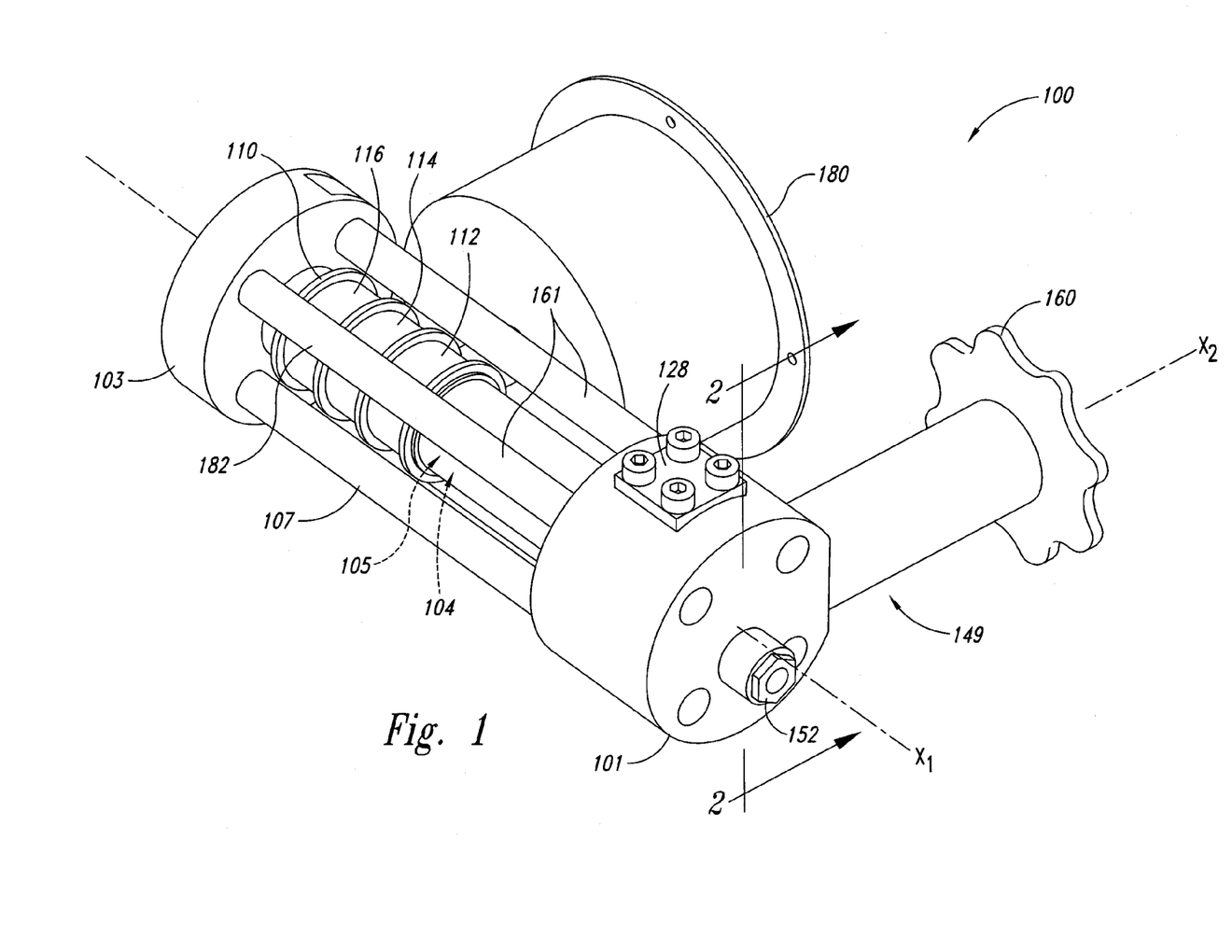
FIG. 1 is an isometric view of a flow measuring apparatus with a piston manually launched in accordance with an embodiment of the present invention.
Figure 2:
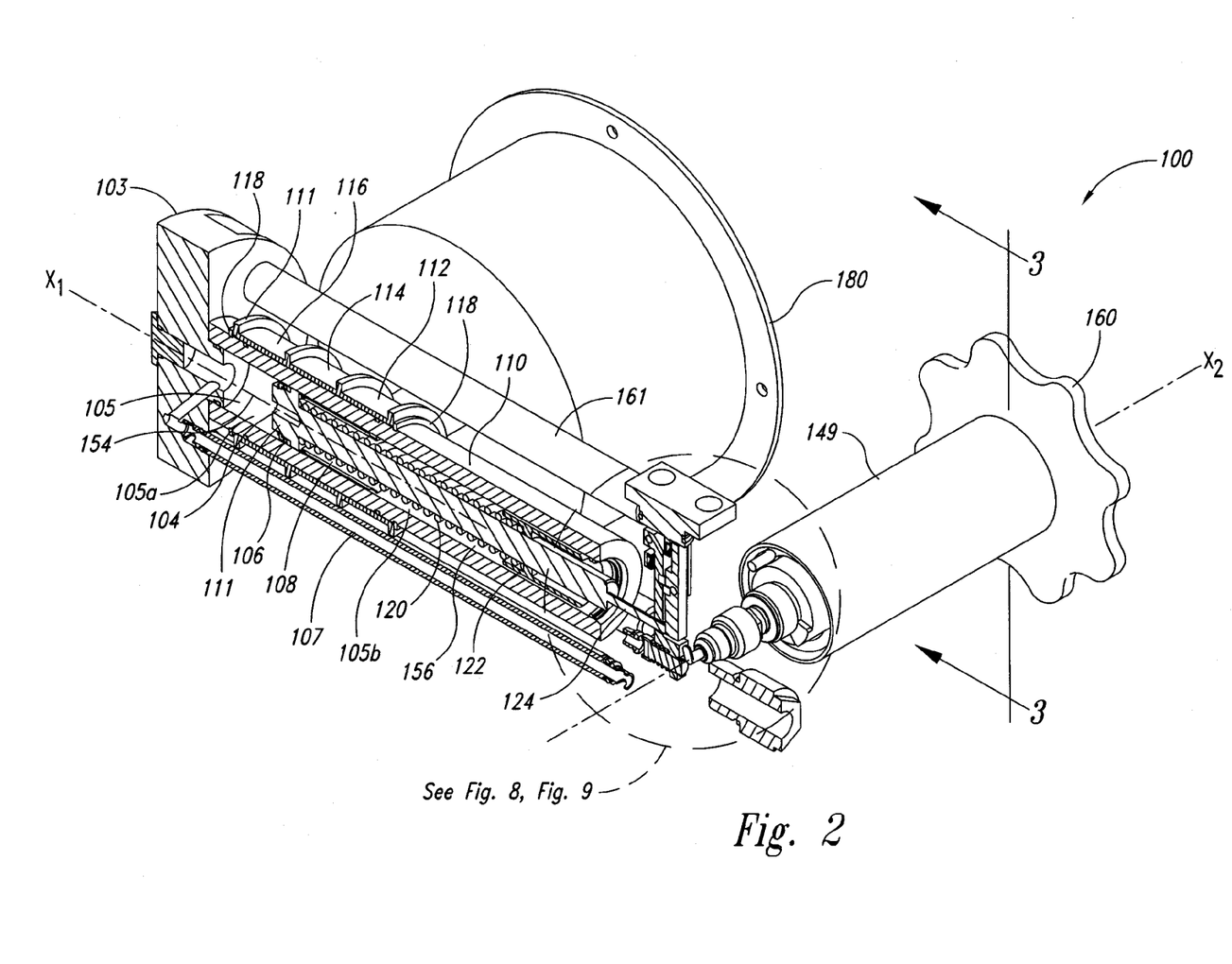
FIG. 2 is an isometric view of the flow measuring apparatus of FIG. 1 with a portion shown in cross-section taken substantially along lines 2-2 of FIG. 1.
Figure 3:
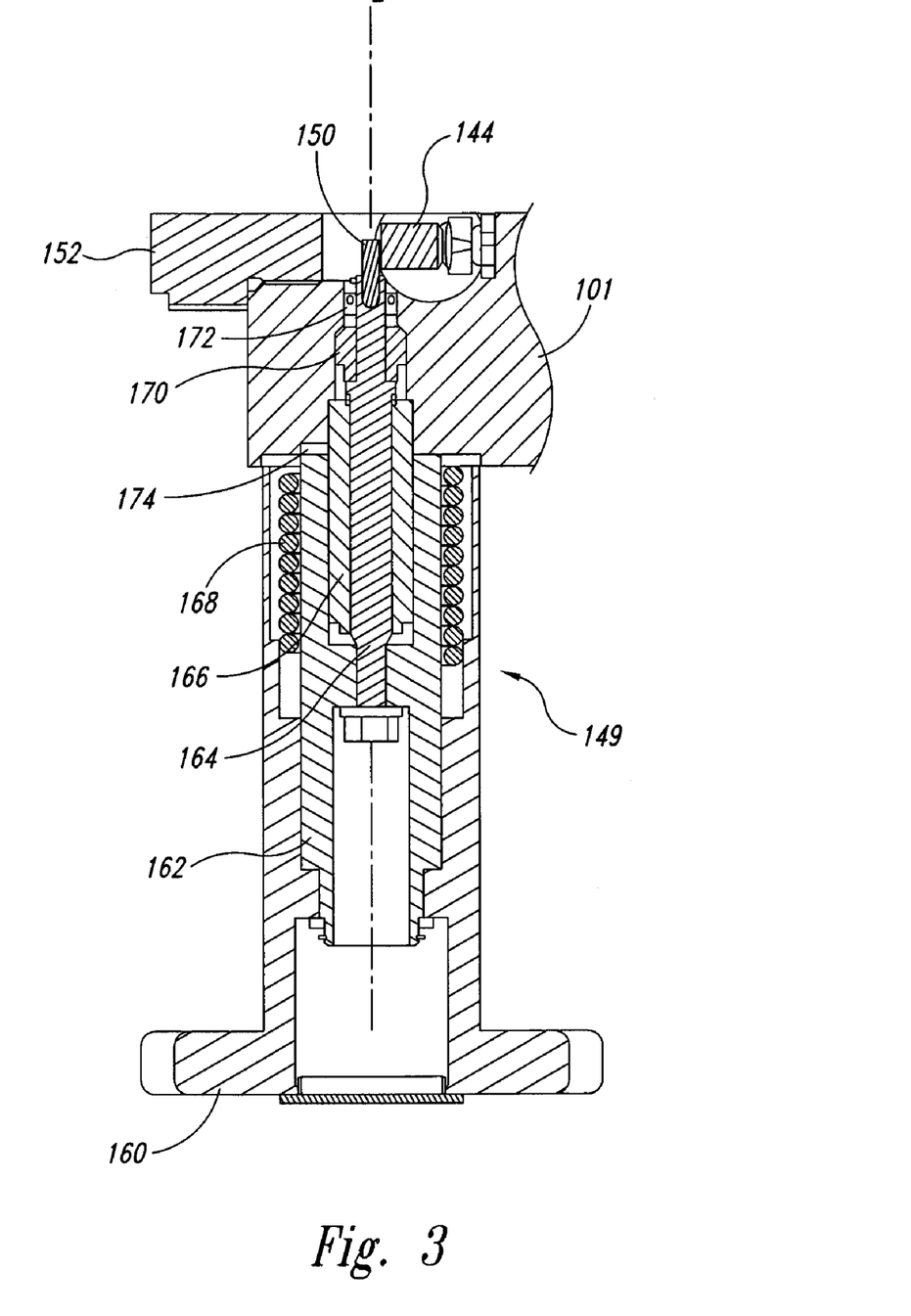
FIG. 3 is an enlarged cross-sectional view of a manually activatable actuator or launch mechanism taken substantially along lines 3-3 of FIG. 2.

FIG. 1 is an isometric view of a flow measuring apparatus 100 for measuring fluid flow rate in accordance with one embodiment of the invention. FIG. 2 is an isometric view of the flow measuring apparatus of FIG. 1 with a portion shown in cross-section taken substantially along lines 2-2 of FIG. 1. FIG. 3 is an enlarged cross-sectional view of a manually activatable launch mechanism or actuator 149 taken substantially along lines 3-3 of FIG. 2. The flow measuring apparatus of the illustrated embodiment is a flow meter 100 that includes an inlet body section 101 mated to a barrel 110 that has a bore 105 that houses a piston 104 (FIG. 2) and a piston spring 120 (FIG. 2) that urges the piston 104 along axis X1. As best seen in FIG. 2, the piston 104 is sealed to the bore 105 of the barrel 110 by a seal 106 on a piston head 111. The piston spring 120 is shown as a coil spring, although the piston spring could be another biasing member, such as a wave washer or Belleville washer, that provides an urging force against the piston. The seal 106 is shown as a cup seal, although other seals could be used, such as an "O" ring or bellows, to maintain a seal between the piston head 111 and the interior surface of the barrel 110 that defines the bore 105. The piston 104 is slideably disposed in the bore 105, and the piston head 111 and the seal 106 divide the bore 105 into first and second portions 105a and 105b.

Affixed to the piston 104 is a sleeve 108 that is concentric to the piston and can be made of a ferromagnetic material, such as a 400 series stainless steel on other suitable material. The function of the sleeve 104 will be explained in detail below. One end of the piston 104 is guided by the seal 106 and the other end is guided by a sleeve 122 that also centers the spring 120, thereby preventing the spring from rubbing and hence scoring the inside diameter of the barrel 110. Affixed to the end of the barrel 110 opposite to inlet body section 101 is an end cap 103. The end cap 103 supports tie rods 161 and a return tube 107 that run parallel to the barrel 110.

The inlet body 101 of the illustrated embodiment contains a valve assembly 125 that is activatable to direct a fluid flow from a first fluid pathway 127 extending from the inlet 102 to an outlet 152, and a second fluid pathway 129 through the return tube 107 and into the first portion 105a of the barrel's bore 105. The valve assembly 125 of the illustrated embodiment includes a seat 126 that can sealably mate with a disk-shaped sealing pad 148 mounted on a stem 145. The sealing pad 148 is generally made of an elastomeric material, but can be a made from other materials that can engage the seat 126 to form a fluid tight seal. The sealing pad 148 is supported by a pad end 145b of the stem 145. The stem 145 and the sealing pad 148 are urged by a spring 146 toward the seat 126. The spring 146 of the illustrated embodiment is a coil spring, although another biasing device could be used to urge the sealing pad 148 against the seat 126.

As best seen in FIGS. 4 and 7-9, the inlet body 101 contains a latch mechanism 137 having a mounting structure 128 and a pair of pivotal levers 130 and 132 that work together to move the valve assembly 125 between open and closed positions. The first lever 130 carries the stem 145 and the sealing pad 148 such that the first lever, the stem, and the sealing pad can move as a unit relative to the seat 126 between the open and closed positions. In the illustrated embodiment, the lower end of the first lever 130 has a hole 131 through which the shank end 145a of the stem 145 extends. The stem 145 is secured to the lower end of the first lever 130 by a snap ring 133, although other securing devices could be used in other embodiments. In the illustrated embodiment, the hole 131 in the first lever 130, the snap ring 133, the spring 146, the stem 145, the seat pad 148 and the seat 126 are co-axial. The first lever 130 is pivotally supported by the mounting structure 128 by a first dowel 134 on an upper end portion of the first lever. The second lever 132 generally overlaps and is approximately parallel to the first lever 130. The second lever 132 is pivotally supported by the mounting structure 128 by a dowel 136 in approximately the center of the second lever 132.

The first and second levers 130 and 132 are configured to releasably retain the valve assembly 125 in the closed position when the flow meter 100 is activated and to allow the latch mechanism 137 to be released and the valve assembly moved to the open position. In the illustrated embodiment, the first lever 130 has a dog 140 affixed near its center and positioned to make intermittent contact with a dog 138 affixed near the center of the second lever 132. A spring 144 or other biasing device guided and supported by the mounting structure 128 engages the first lever 130 so that the dog 140 is urged toward the second lever 132. The dog 140 on the first lever 130 engages a corner of the dog 138 on the second lever 132. The second lever 132 is connected to another spring 142 or other biasing member supported by the mounting structure 128. The spring 142 presses against the second lever 142 and urges it toward the first lever 130 so that the spring 142 urges the second lever's dog 138 against the first lever's dog 140 when the valve assembly 125 is in this closed position.

In one orientation, the dogs 138 and 140 contact each other and maintain an angular position of the first lever 130, referred to as the "latched" position, so that the valve assembly 125 is in the closed position with the sealing pad 148 sealably engaging the seat 126. When the latch mechanism 137 is in the "latched" position, the sealing pad 148 blocks the fluid flow from passing through the seat 126, thereby preventing the flow from passing through the first fluid pathway 127 to the outlet 152. Instead, the fluid flow is diverted into the second fluid pathway 129, through the return tube 107 and into the barrel's first portion 105a, so as to cause the piston 104 to move axially toward the latch mechanism 137.

In a second orientation, the dogs 138 and 140 lose contact with each other, and the latch mechanism moves to an unlatched position with the first lever 130 being rotated toward the second lever by the urging force of the spring 144. Accordingly, the sealing pad 148 moves away from and loses contact with seat 126, such that the valve assembly moves to the open position. When the latch mechanism 137 is in the unlatched position, the valve assembly 125 is in the open position, and the fluid flow is allowed to flow through the flow meter's inlet 102, through the first fluid pathway 127, including through the open valve assembly 125, and out of the flow meter through the outlet 152.

The latch mechanism 137 and the valve assembly 125 are activated to move from the unlatched and open positions to the latched and closed positions by an actuator 149 coupled to the mounting structure 128. In the illustrated embodiments, the actuator 149 is a manual device that an operator can activate to close the valve assembly 125 and divert the fluid flow into the second fluid pathway 129 so as to measure aspects of the fluid flow. The manual activator 149 of the illustrated embodiment has a rotatable cam 150 adjacent to the lower end of the latch mechanism's first lever 130. The cam 150 can be rotated to engage and pivot the first lever 130, thereby moving the valve assembly 125 to the closed position with the sealing pad 148 in sealed engagement with the seat 126.

As best seen in FIG. 3, the cam 150 of the actuator 149 is supported on the end of a shaft 164, sealed to the inlet body 101 by a rotary cup seal 172 or any seal designed for sealing a rotating shaft. The shaft 164 is supported in two places by bushings 170 and 166 concentric to the shaft 164 and affixed to inlet body 101. A liner 162 is also concentric to the shaft 164, and the liner has a protrusion on its end that mates with the inlet body 101. A spring 168 is coupled to the shaft 164 and it urges the rotation of the shaft 164 and the liner 162. Rotation of the liner 162 and the shaft 164 is limited by a protrusion on the end of the liner 162 moving in a pocket 174 in the inlet body 101.

A handle 160 is affixed and concentric to the liner 162. The handle 160 is configured so an operator can grasp and rotate the handle to activate the actuator 149. This rotation of the handle 160 also rotates the liner 162 and the shaft 164, thereby causing the cam 150 to rotate relative to the latch mechanism 137. The rotating cam 150 presses against the first lever 130 to move the latch mechanism 137 to the latched position, thereby moving the latch assembly 125 to the closed position. The sealing pad 148, which is against the seat 126, blocks off the by-pass and causes the fluid to flow into the first portion 105a of the bore 105. The fluid pressure in the bore's first portion 105a builds and presses against the piston 104, thereby moving the piston axially and compressing the spring 120. Accordingly, the piston 104 begins a measurement cycle, wherein the piston moves along a measurement stroke to an end position and then returns to its starting position.

Figure 4:
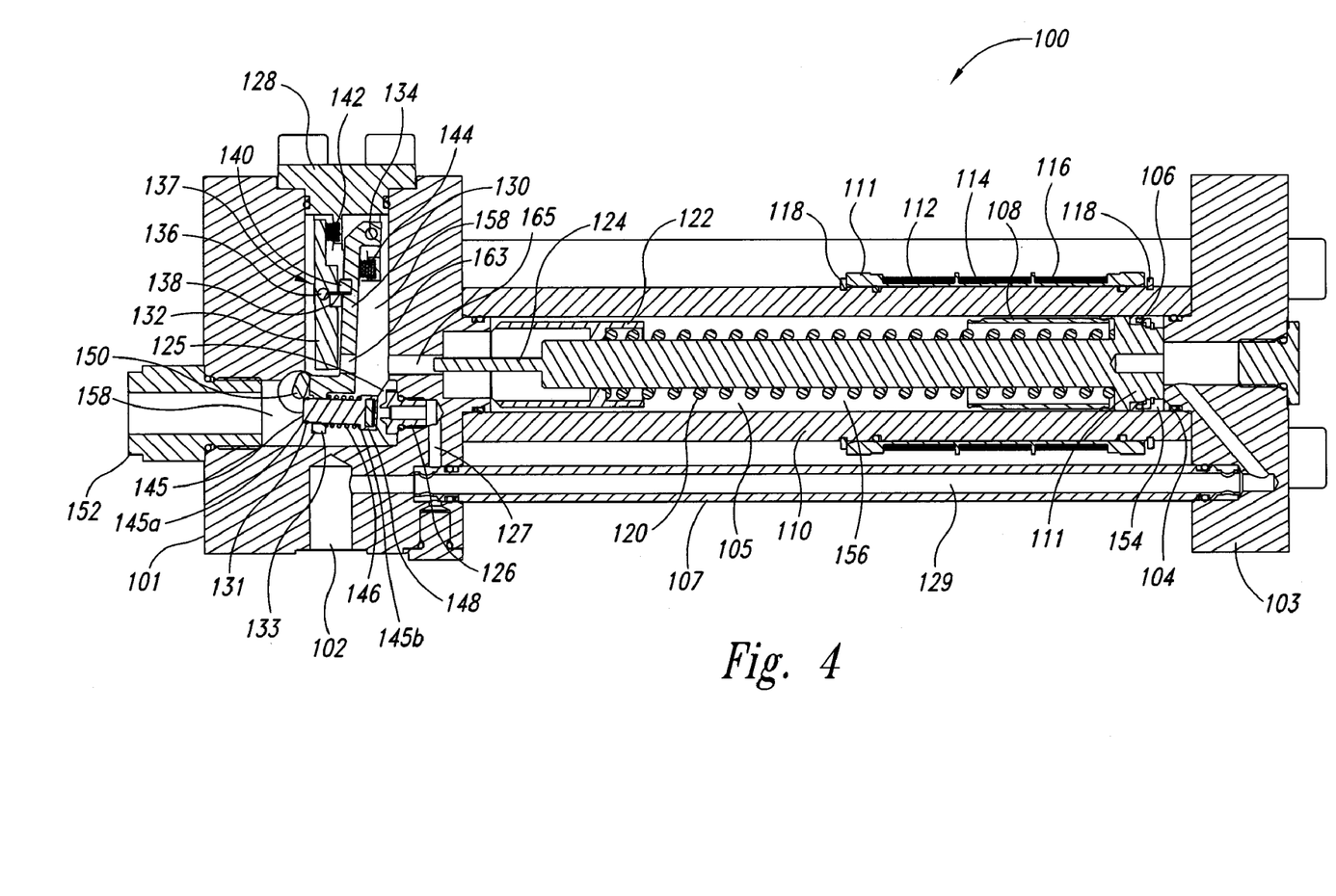
FIG. 4 is an enlarged cross-sectional view of the flow measuring apparatus of FIG. 2 with the piston in a first or dormant position prior to movement through a measurement stroke.

When the flow meter 100 is in the dormant state, the latch mechanism 137 is in the unlatched position and the valve assembly is in the open position, as shown in FIG. 4. The fluid enters the inlet 102 and flows through the seat 126 toward the sealing pad 148. In this mode, the sealing pad 148 does not contact the seat 126 so the fluid flows past the sealing pad, through the first fluid pathway 127, into a cavity 158 downstream of the valve assembly 125, and then to the outlet fitting 152. In this dormant state, the fluid pressure loss in the flow meter 100 due to restrictions from inlet 102 to outlet 152 is generally negligible.

When the actuator 149 is actuated so the valve assembly 125 is moved to the closed position, the fluid flowing to the seat 126 is blocked by the sealing pad 148. The fluid is diverted to the second fluid passageway 129 and moves through the connection tube 107, to the end cap 103, and then into the barrel 110. As the fluid flows into the bore's first portion 105a, the piston 104, which is sealed to the barrel 110 by the cup seal 106, blocks the fluid from flowing into the barrel's second portion, such that increased fluid pressure is exerted on the piston. As the pressure builds in the cavity 104, which shares the same pressure as the connection tube 107 and the inlet 102, the piston 104 moves axially along a measurement stroke toward the inlet body 101 and the latch mechanism 137.

Figure 5:
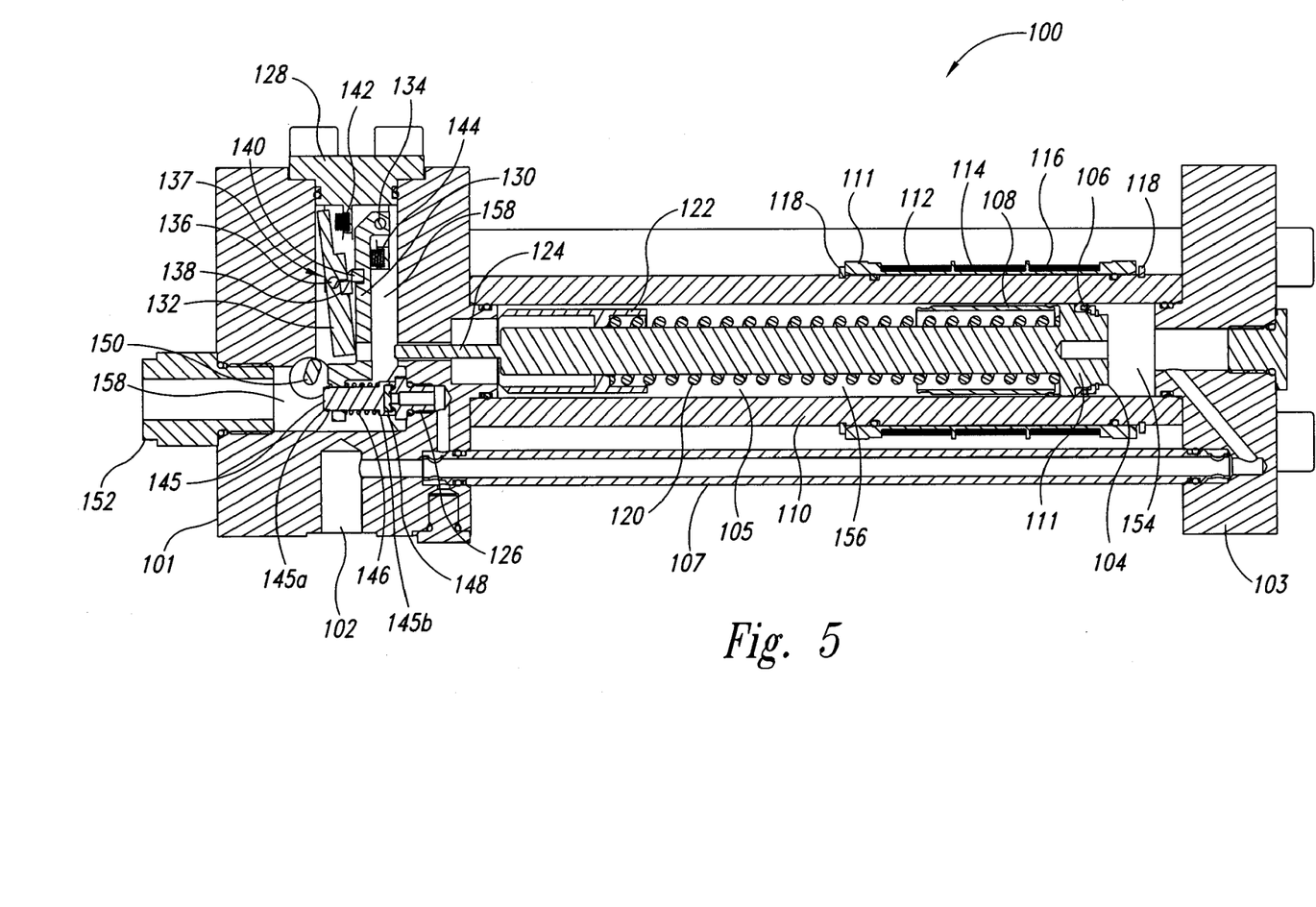
FIG. 5 is an enlarged cross-sectional view of the flow measuring apparatus of FIG. 2 with the piston in an intermediate portion of the measurement stroke.

FIG. 5 shows the piston 104 in the middle of the measurement stroke. While the piston 104 is moving toward the latch mechanism 137, the position of the ferromagnetic sleeve 108 on the piston 104 also moves, and its position can be measured by inductive means, such as a Linear Variable Differential Transformer "LVDT" or a by a Hall effect sensor. In other embodiments, the piston's movement along the measurement stroke can be measured over time by other measuring techniques. The sensors are non-evasive and produce no drag opposing the movement of piston 104.

Figure 6:
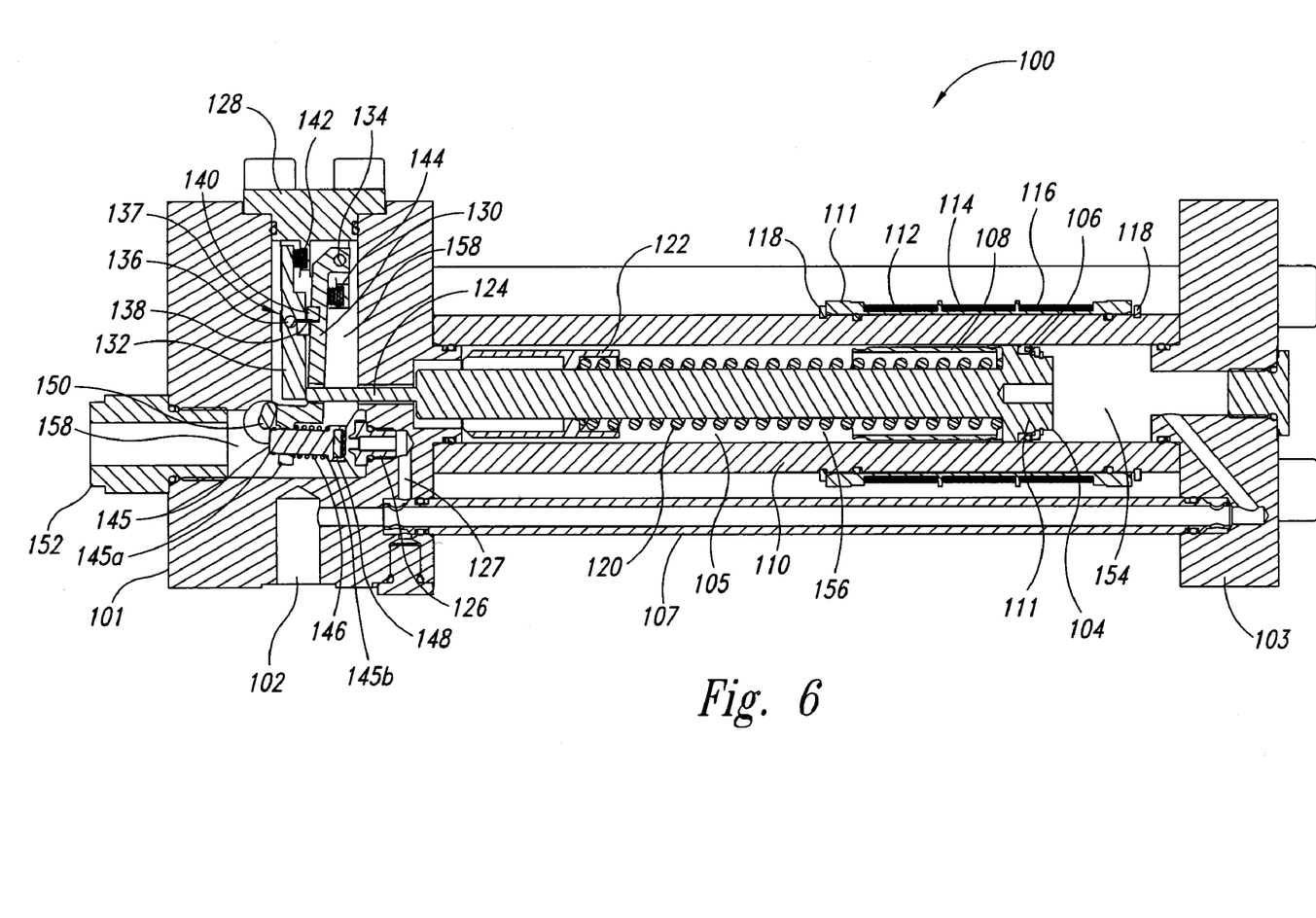
FIG. 6 is an enlarged cross-sectional view of the flow measuring apparatus of FIG. 2 with the piston in a second end portion of the measurement stroke.
Figure 7:
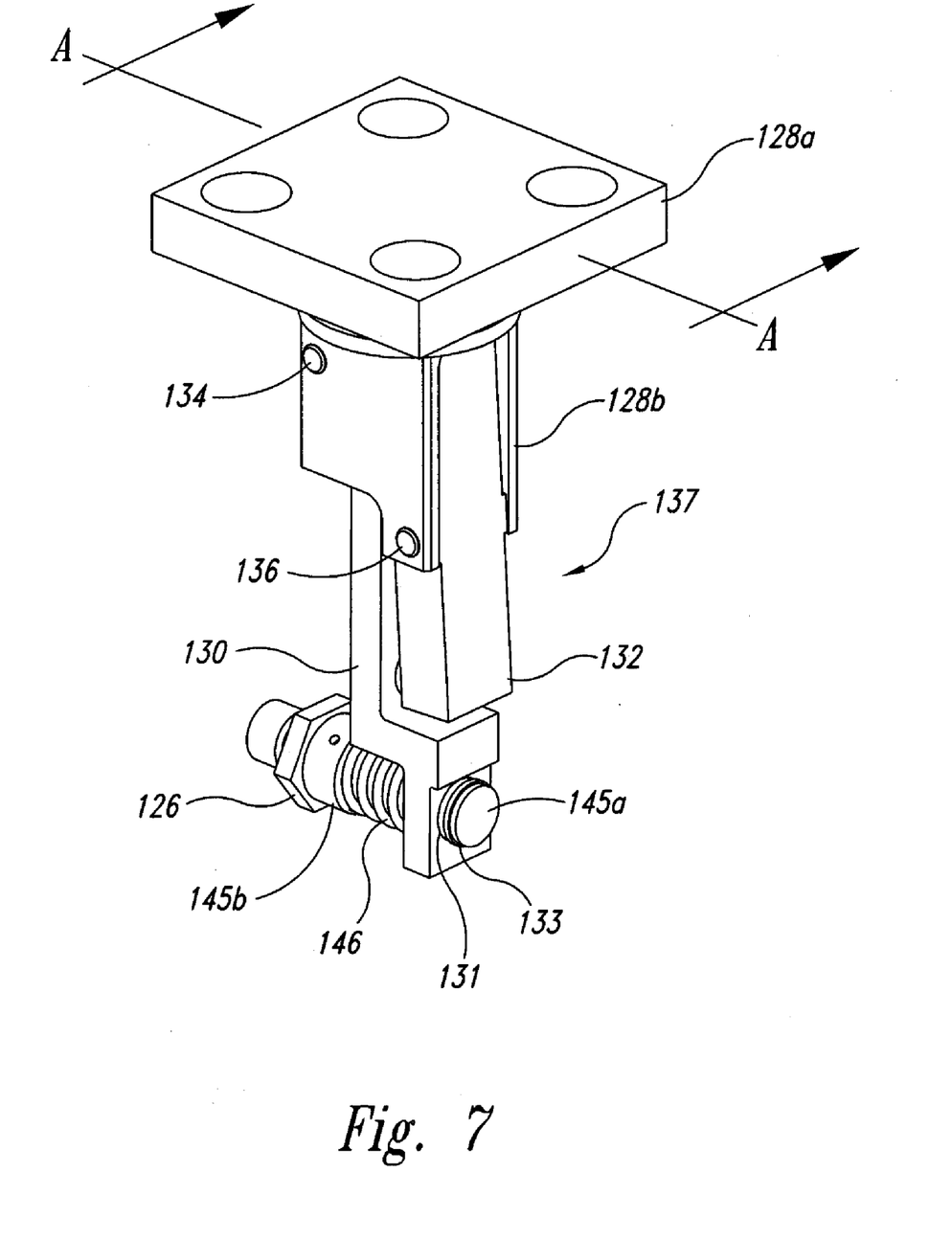
FIG. 7 is an enlarged isometric view of the manual sealing pad/latching mechanism shown removed from the flow measuring apparatus of FIG. 1 for purposes of clarity.
Figure 8:
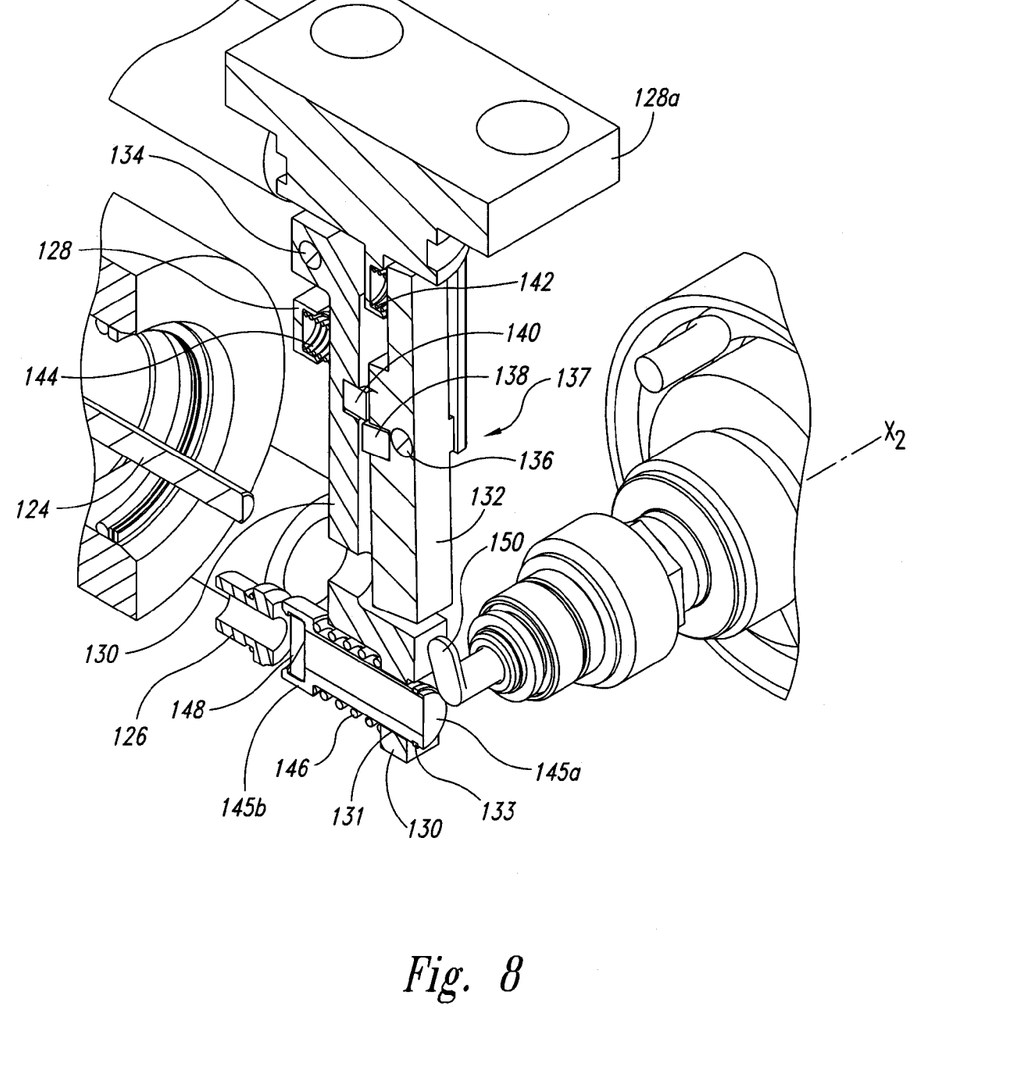
FIG. 8 is an enlarged cross-sectional view of a portion of the flow measuring apparatus of FIG. 2 showing the manual sealing pad/latching mechanism with a sealing pad in the open position.
Figure 9:
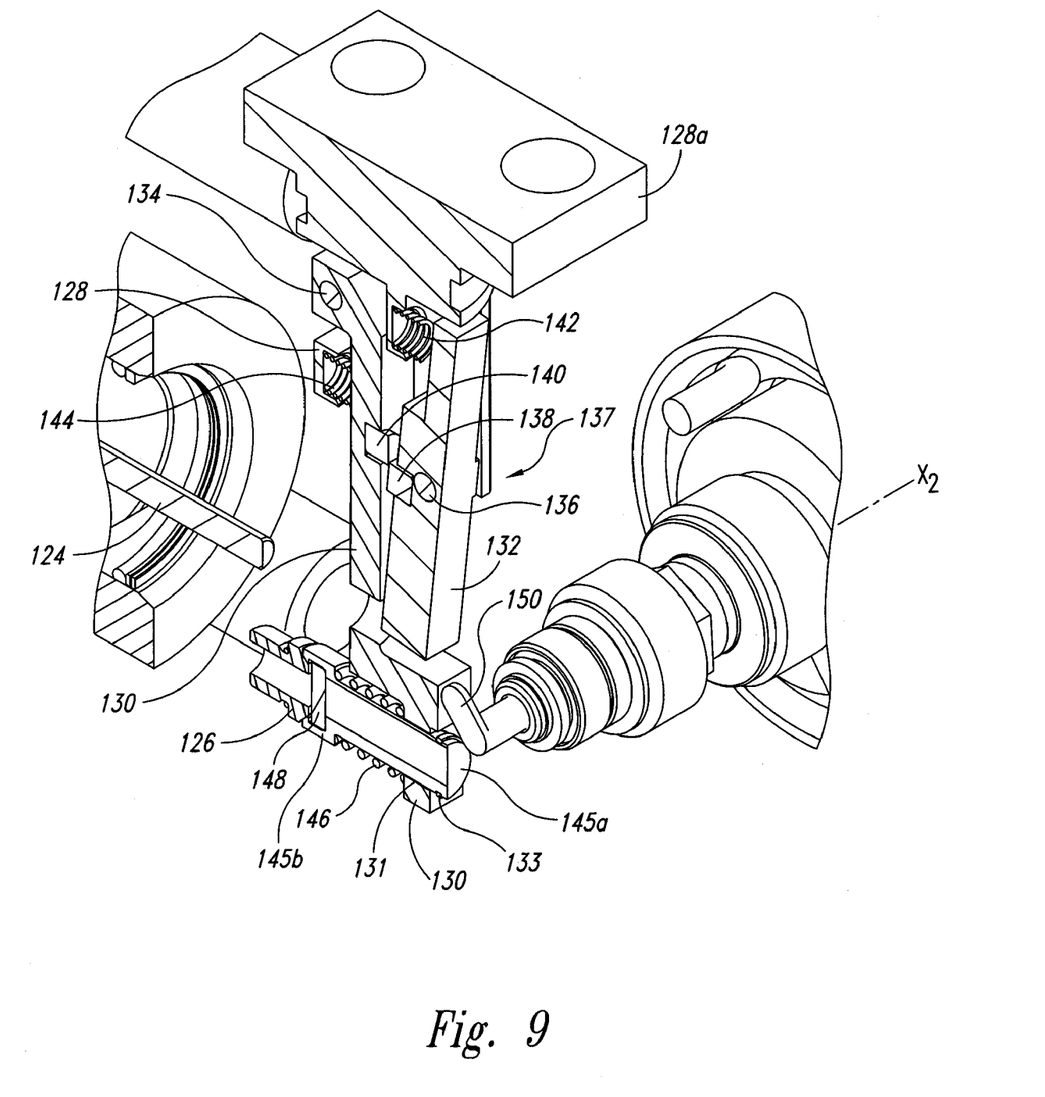
FIG. 9 is an enlarged cross-sectional view of a portion of the flow measuring apparatus of FIG. 2 showing the manual sealing pad/latching mechanism with the sealing pad in the closed position.

In the illustrated embodiment, the end of the piston 104 opposite the piston's head 111 has a distal protrusion 124 with a smaller diameter than the head 111 or body of the piston. FIG. 6 shows the piston 104 at the end of the measurement stroke. In this position, the distal protrusion 124 passes though a hole 165 in the inlet body 101 and a hole 163 in first lever 130. Each hole 165 and 163 is axially aligned with the piston 104 and the protrusion 124.

The end of the protrusion 124 is configured to contact the second lever 132 as the piston 104 moves to the end of the measurement stroke. This contact with the latch mechanism 137, which is in the latched position, rotates the second lever 132 away from the first lever 130, which causes the dogs 138 and 140 to lose contact with each other. When the dogs 138 and 140 unlatch from each other, the first lever 130 is rotated by the spring 144 reacting with the mounting structure 128, so that valve assembly 125 is moved to the open position with the sealing pad 148 moved away from the seat 126. Once the sealing pad 148 is not blocking the flow from passing through the seat 126 and along the first flow passageway 127, the piston 104 is urged in the opposite direction by the piston spring 120.

In the event of a malfunction of the piston 104 or the latching mechanism 137 that causes an obstruction to the movement of the piston during a measurement stroke, the sealing pad 148 of the valve assembly 125 will experience a rise in fluid pressure that is greater than the pressure exerted by compression of piston spring 120 at the completion of a measurement stroke. As best seen in FIG. 6, the sealing pad 148 is downstream of the seat 126. When the valve assembly 125 is in the closed position, the spring 146 on the stem 145 urges the sealing pad 148 against the seat 126. If, however, the pressure upstream of the sealing pad 148 exceeds the sealing force from the spring 146, referred to as an over pressure condition, the fluid will push the sealing pad away from the seat 126 to allow fluid to pass through the valve assembly and to release pressure from the barrel 110. Accordingly, the valve assembly 125 is configured to provide a "fail open" or "fail as is" condition. After the over pressure condition is alleviated, the valve assembly will return to the closed position.

Figure 10:
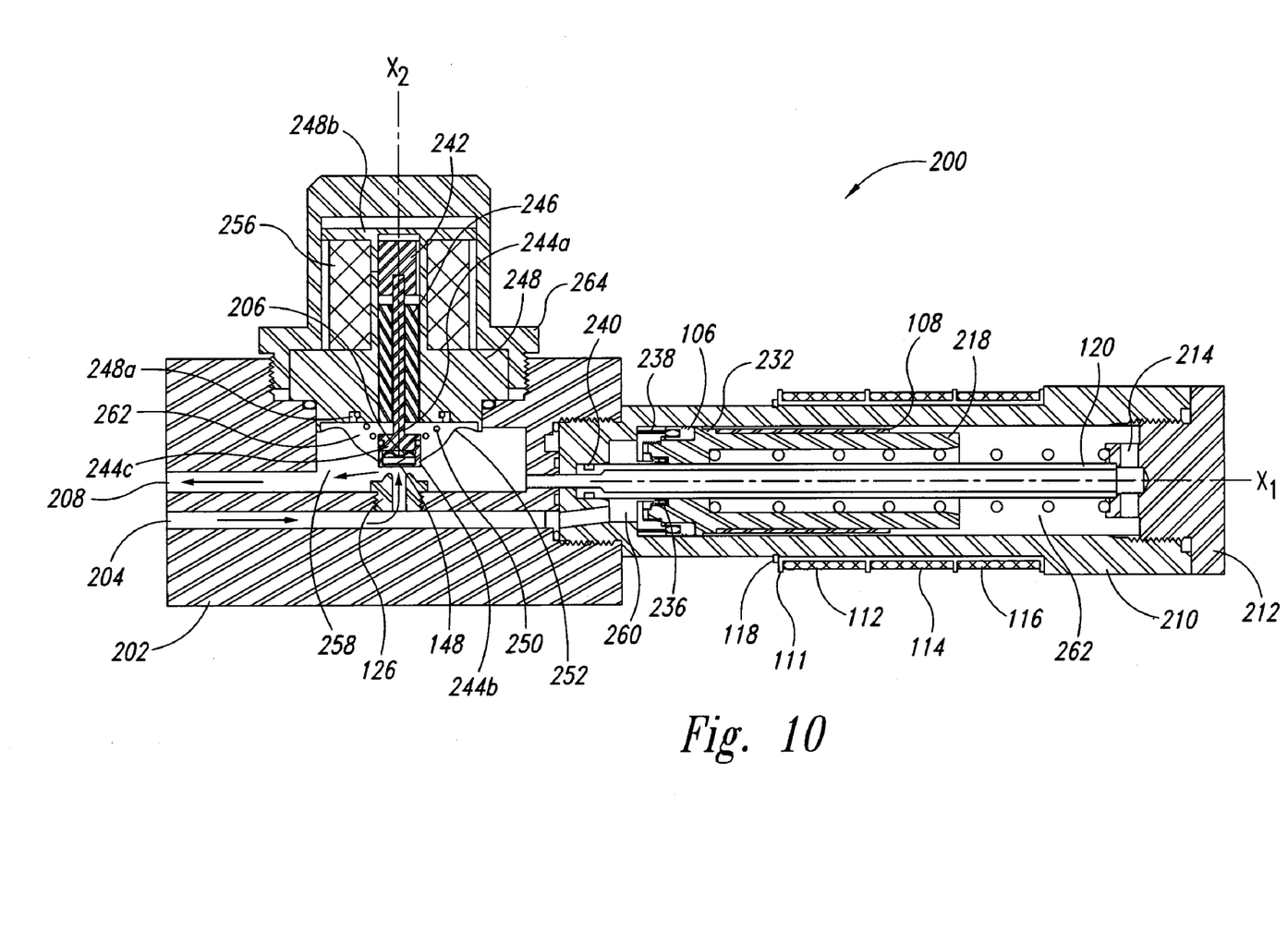
FIG. 10 is a cross-sectional view of a flow measuring apparatus in accordance with another embodiment with a solenoid launch system with a sealing pad shown in the open position.
Figure 11:
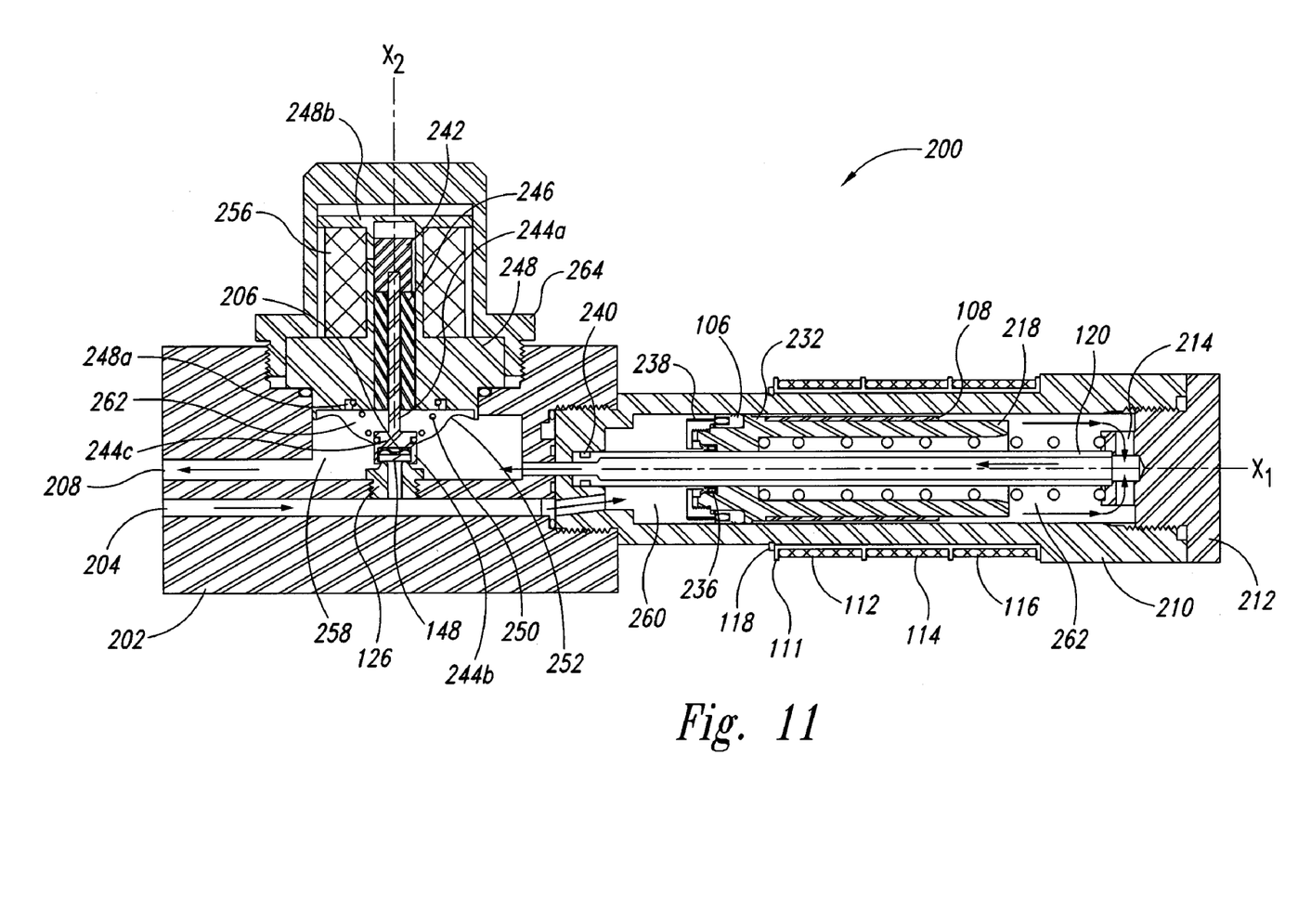
FIG. 11 is a cross-sectional view of a flow measuring apparatus of FIG. 10 with the sealing pad in the closed position.

FIGS. 10 and 11 are cross-sectional views of a portion of a flow measuring apparatus 200 in accordance with another embodiment. The illustrated flow measuring apparatus 200 is a flow meter configured to selectively block flow through a by-pass to move a piston 218 against spring 120 under the watch of a position measuring system, substantially as described above with reference to the flow meter 100. Movement of sealing pad 148 in this alternative embodiment is controlled by a solenoid assembly 219 comprised of an armature 242 that moves along axis X 2 and is affixed to a stem shank 244a. The stem shank 244a of the illustrated embodiment is cylindrical in shape and widens to house the sealing pad 148 on end 244c.

A sealing pad spring 206 is sandwiched between the shank end 244c and the sealing pad 148. The sealing pad spring 206 can be any one of a plurality of compression spring designs such as a coil spring, wave washer, or even a rubber washer. The illustrated armature 242 is made from a ferromagnetic material, while stem shank 244a need not be ferromagnetic. A bonnet 248 contains oil inside of it's hollow cylinder section and has a flange 248b attached to one end that acts as the end of a bobbin to contain conductive windings 256. A target 246 is made of a ferromagnetic material and is anchored to the bonnet 248. The bonnet 248 of the illustrated embodiment is affixed to the body 202 by a clamp nut 264, which also protects the windings 256. The target 246 is a hollow cylinder concentric to the bonnet 248, the armature 242, the stem shank 244a, the sealing pad 148, and the seat 126.

An outside diameter of a diaphragm 252 is affixed and sealed to the bonnet 248, and the inside diameter of the diaphragm 252 affixed and sealed to the valve stem 244c. A return spring 250 is affixed on one end to the stem 244c and on the other end to the bonnet 248. The diaphragm 252 provides a barrier between the ferromagnetic armature 242 bathed in oil and process fluids, thereby preventing debris from process fluids lodging between the small clearances between the armature 242 and the inside diameter of the bonnet 248, which would retard the motion of the armature 242. A return spring 250 urges the sealing pad 148, the stem 244, and the sealing pad spring 206 away from the seat 126 along axis X2.

Like the piston 104 of the flow meter 100 discussed above, the piston 218 supports the ferromagnetic sleeve 108. Movement of the sleeve 108 can be detected using the LVDT principle using the three coils 112, 114, and 116 shown in FIGS. 10 and 11. Measuring the travel of piston 218 over time can also be achieve with other non-evasive proximity sensors, such as Hall effect sensors or a variety of evasive position sensors. The piston 218 is hollow and travels over a stationary tube 214 that returns fluid from the cavity 262 that contains the piston spring 120. The piston 218 has a first cup seal 106 that sealably engages the inside diameter of barrel 210. The inside of piston 218 has a second cup seal 236 that sealably engages the return tube 214.

To enhance clarity and to avoid obscuring aspects of the embodiment, ferrules and washers made from ferromagnetic material to enhance the efficiency of the solenoid are not show. When direct current or alternating current is applied to the windings 256, the armature 242 is electromagnetically attracted to the target 246. This attractive force moves the stem shank 244, the sealing pad spring 206, and the sealing pad 148 against the seat 126 until the target 246 contacts the armature 242.

Once the target 242 and the armature 246 have made contact, the force exerted by the sealing pad 148 on the seat 126 is governed by the spring tension in the sealing pad spring 206. Whilst the windings 256 are energized and the sealing pad 148 contacts the seat 126, fluid entering the inlet 204 is diverted into the chamber 260 on the cup seal side of the piston 218. Diversion of fluid to the chamber 260 causes the piston 218 to move the compressing spring 120, as shown in FIG. 11. Piston-position sensors measure the rate of travel of the piston 218 over the stroke and send signals to a microprocessor to compute the flow rate.

During normal operation, the windings 256 are de-energized at the end of the measurement stroke before the piston 218 contacts the end cap 212. Once the coil windings 256 are de-energized, the armature 242 and the sealing pad 148 move away from the seat 126, which opens the by-pass and allows the piston spring 120 to urge the piston 218 back to the dormant position shown in FIG. 10. The piston 218 can collide with the end cap 212 without significantly damaging the flow meter 200. If these two components collide, the pressure builds under the sealing pad 148 in the inside diameter of the seat 126 until the pressure overcomes the force that the sealing pad spring 206 exerts on the seat 126. In additional embodiments, flow measuring devices may include other components in lieu of the solenoid for automating the operation.

For both flow meters 100 and 200 described above, the condition of the piston seals, the sealing pad, and/or other components can be checked periodically without removing the flow meter from the flow line. For example, in one embodiment, the flow meter can be checked by activating the sealing pad 148 against the seat 126 to send the piston 104 or 218 into any section of its measurement stroke. Before either piston 104 or 218 reaches the end of the stroke a valve external to the flow meter can be used to block the flow. The external valve can be connected to either the outlet or inlet of flow meter 100 or 200. If the external valve blocks the flow with no leakage through the external valve, the piston in the flow meter 100 or 200 should be suspended at some position in the measurement stroke with negligible movement. If there is a leak across the piston seal and/or sealing pad in the meter 100 or 200, the piston spring 120 will urge the piston in the opposite direction that it started on its measurement stroke. The position sensors for the flow meter 100 or 200 can detect this reverse movement and report the leak of the piston seal and/or sealing pad. This feature is referred to as "self diagnostics" with all checks performed without removing the meter from the flow line.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A flow measuring apparatus connectable to a flow of fluid, comprising:
   a barrel having an interior area;
   a piston movable in the barrel between first and second positions, the piston divides the interior area into first and second portions;
   a biasing member coupled to the piston and urging the piston toward the first position;
   a first fluid passageway having an inlet, an outlet and an intermediate portion therebetween;
   a second fluid passageway in fluid communication with the first fluid passageway and with the first portion of the barrel, the second fluid passageway being configured to provide fluid from the intermediate portion of the first fluid passageway to the first portion of the barrel to move the piston toward the second position;
   a valve assembly coupled to the first fluid passageway downstream of the intermediate portion, the valve assembly being movable between an open position that allows fluid to pass through the first fluid passageway to the outlet and a closed position that causes fluid to flow into the second flow passageway and into the first portion of the chamber to move the piston from the first position to the second position, the valve assembly being movable away from the closed position to release pressure from the barrel in an overpressure condition;
   a latch mechanism coupled to the valve assembly and being movable between an activated position and a released position, the latching mechanism in the activated position moves the valve assembly to the closed position, and the latching mechanism in the released position allowing the valve assembly to move to the open position, the latching mechanism being configured to move to the released position at least when the piston reaches the second position;
   an actuator coupled to the latching mechanism and configured to activate the latch mechanism to move the valve assembly to the closed position to cause the fluid to move the piston to the second position; and
   a measuring device configured to monitor the movement of the piston through a stroke between the first and second positions and the time to complete the stroke.

2. The flow measuring apparatus of claim 1, further comprising a seal coupled to the piston and sealably engaging the barrel to prevent fluid from passing around the piston between the first and second portions.

3. The flow measuring apparatus of claim 1, further comprising an endcap connected to the barrel, the latching mechanism and the valve assembly being contained in the end cap, and the actuator connected to the end cap.

4. The flow measuring apparatus of claim 1 wherein the biasing member is a spring in the second portion of the barrel's interior area, the spring being configured to be compressed when the piston moves to the second position.

5. The flow measuring apparatus of claim 1 wherein the piston is configured to move the latch mechanism to the released position when the piston reaches the second position.

6. The flow measuring apparatus of claim 1 wherein the valve assembly has a valve seat with an aperture that defines a portion of the first fluid passageway so fluid will flow through the valve seat when the valve assembly is in the open position, valve assembly having a sealing member axially coupled to the latching mechanism and being in engagement with the valve seat to block fluid from flowing through the valve seat when the valve assembly is in the closed spaced, and the sealing member being spaced apart from the valve seat to allow fluid to move through the first fluid passageway to the outlet when the valve assembly is in the open position.

7. The flow measuring apparatus of claim 6 wherein the valve assembly includes a second biasing member that urges the sealing member against the valve seat when the valve assembly is in the closed position.

8. The flow measuring apparatus of claim 1 wherein the valve assembly is a self venting assembly movable away from the closed position to a venting position to allow fluid to pass therethrough in an overpressure condition.

9. The flow measuring apparatus of claim 1 wherein the valve assembly has a biasing member configured to retain the valve assembly in the closed position at least until the piston has reached the second position and wherein the fluid is at a first fluid pressure, and the biasing member being configured to allow the valve assembly to move away from the closed position when the fluid pressure is at a second fluid pressure greater than the first fluid pressure.

10. The flow measuring apparatus of claim 1 wherein the actuator is a manually activatable mechanical actuator configured to move the latch mechanism to the activated position.

11. The flow measuring apparatus of claim 1 wherein the actuator is an electro-mechanical device configured to move the latch mechanism to the activated position.

12. The flow measuring apparatus of claim 1 wherein the electro-mechanical device includes a solenoid.

13. The flow measuring apparatus of claim 1 wherein the piston includes a piston head and a seal connected to the piston head and sealable engaging an inner surface of the barrel.

14. The flow measuring apparatus of claim 1 wherein the latch mechanism includes pivotally mounted first and second levers, the first lever being connected to a valve portion of the valve assembly and being movable to a latched position with the valve portion in the closed position, the second lever configured to releaseably retain the first lever in the latched position and being allow the first lever to move to an unlatched position when the piston reaches the second position.

15. The flow measuring apparatus of claim 1 wherein the second passageway is external to the barrel.

16. The flow measuring apparatus of claim 1, further comprising first and second end members connected to opposing ends of the barrel, and connection members extending therebetween, wherein the second fluid passageway extends through at least one of the connection members.

17. A flow measuring apparatus, comprising:
   a first fluid passageway having a fluid inlet configured to receive a fluid flow, a fluid outlet, and an intermediate portion therebetween;

a biased piston movable between first and second positions, the piston being biased toward the first position;

a second fluid passageway that provides fluid from the intermediate portion of the first fluid passageway to a portion of the piston to move the piston toward the second position;

a valve coupled to the first fluid passageway downstream of the intermediate portion, the valve having a valve member movable between an open position that allows the fluid flow to pass through the first fluid passageway to the fluid outlet and a closed position that directs the fluid flow into the second flow passageway and to the portion of the piston to move the piston from the first position to the second position, the valve having a biasing member that urges the valve member with an urging force to the closed position, and the biasing member allowing the valve member to move away from the closed position when fluid pressure on the valve member exerts a force that exceeds the urging force;

an activation mechanism coupled to the valve and being movable between a released position wherein the valve is in the open position and an activated position that causes the valve to move to the closed position, the activation mechanism moves to the released position at least when the piston reaches the second position; and a measuring device configured to monitor the movement of the piston through a stroke between the first and second positions and the time to complete the stroke.

18. The flow measuring apparatus of claim 17 wherein the biased piston includes a spring member configured to be compressed when the piston moves to the second position.

19. The flow measuring apparatus of claim 17 wherein the piston is configured to move the activation mechanism to the released position when the piston reaches the second position.

20. The flow measuring apparatus of claim 17 wherein the valve has a valve seat with an aperture that defines a portion of the first fluid passageway, a sealing member coupled to the activation mechanism and positionable against the valve seat to block fluid from flowing through the valve seat when the valve is in the closed spaced, and the sealing member is spaced apart from the valve seat to allow fluid flow therethrough when the valve is in the open position.

21. The flow measuring apparatus of claim 17 wherein the valve is exposed fluid at up to a first fluid pressure when the valve is in the closed position and when the piston reaches the second position, the valve includes a biasing member configured to retain the valve in the closed position when the fluid is at up to the first fluid pressure, and the biasing member being configured to allow the valve to move away from the closed position when the fluid pressure is at a second fluid pressure greater than the first fluid pressure.

22. The flow measuring apparatus of claim 17 wherein valve is a self-venting valve movable away from the closed position to a venting position.

23. The flow measuring apparatus of claim 17, further comprising an actuator coupled to the activation mechanism and configured to move the valve to the closed position to cause the fluid to move the piston to the second position.

24. The flow measuring apparatus of claim 23 wherein the actuator is manually activateable.

25. A flow measuring apparatus connectable to a fluid flow, comprising:

a cylinder having an interior area;

a piston movable in the interior area between first and second positions, the piston divides the interior area into first and second portions;

a biasing member urging the piston toward the first position;

a first fluid passageway that allows fluid to bypass the piston;

a second fluid passageway in fluid communication with an intermediate portion of the first fluid passageway and with the first portion of the cylinder, the second fluid passageway being configured to provide fluid from the first fluid passageway to the first portion of the cylinder to move the piston toward the second position;

a flow diverter coupled to the first fluid passageway downstream of the intermediate portion, the flow diverter being movable between a first flow position that allows fluid to pass through the first fluid passageway to the outlet and a second flow position that causes fluid to flow into the second flow passageway and into the first portion of the chamber to move the piston toward the second position;

a retention mechanism coupled to the flow diverter and being moveable to move the flow diverter to the closed position, and the retention mechanism being moveable to allow the flow diverter to move to the open position when the piston reaches the second position; and a sensor configured to monitor the movement of the piston between the first and second positions through a stroke and the time to complete the stroke.

26. The flow measuring apparatus of claim 25, further comprising an activation mechanism coupled to the retention mechanism and being movable between a released position wherein the flow diverter is in the open position and an activated position that causes the flow diverter to move to the closed position, the activation mechanism moves to the released position at least when the piston reaches the second position.

27. The flow measuring apparatus of claim 25, further comprising an endcap connected to the cylinder, the retention mechanism and the flow diverter being contained in the end cap.

28. The flow measuring apparatus of claim 25, further comprising a biasing member in the second portion of the cylinder and configured to be compressed when the piston moves toward the second position.

29. The flow measuring apparatus of claim 25 wherein the piston moves the retention mechanism to the released position when the piston reaches the second position.

30. The flow measuring apparatus of claim 25 wherein the flow diverter has a seat with an aperture that defines a portion of the first fluid passageway so fluid will flow through the valve seat when the flow diverter is in the open position, flow diverter having a sealing member axially coupled to the retention mechanism and being in engagement with the seat to block fluid from flowing through the seat when the flow diverter is in the closed spaced, and the sealing member being spaced apart from the seat to allow fluid to move through the first fluid passageway when the flow diverter is in the open position.

31. The flow measuring apparatus of claim 25 wherein the flow diverter is a valve assembly having a valve seat and a sealing pad.

32. The flow measuring apparatus of claim 25 wherein the flow diverter is self venting and is moveable away from the closed position to a venting position.

33. The flow measuring apparatus of claim 25 wherein the retention mechanism includes pivotally mounted first and second levers, the first lever being connected to a portion of the flow diverter and being movable to a latched position with the portion in the closed position, the second lever configured to releaseably retain the first lever in the latched position and being allow the first lever to move to an unlatched position when the piston reaches the second position.

* * * * *